United States Patent [19]
Richter

[11] 4,029,410
[45] June 14, 1977

[54] METHOD AND APPARATUS FOR MANIPULATING LINE WEIGHT IN AN IMAGE

[75] Inventor: Charles W. Richter, Herndon, Va.

[73] Assignee: The United States of America as represented by the Secretary of the Interior, Washington, D.C.

[22] Filed: Sept. 5, 1975

[21] Appl. No.: 610,810

[52] U.S. Cl. .............................. 355/52; 354/121; 355/55

[51] Int. Cl.² ................... G03B 1/00; G03B 27/52; G03B 27/68

[58] Field of Search ................. 355/52, 55, 18; 354/121, 123, 197; 350/252, 255, 257; 352/142

[56] References Cited
UNITED STATES PATENTS

| | | | |
|---|---|---|---|
| 2,285,768 | 6/1942 | Drucker | 350/255 |
| 2,888,869 | 6/1959 | Katzen et al. | 354/197 |
| 3,508,826 | 4/1970 | Grabau | 355/18 |
| 3,691,922 | 9/1972 | Konig et al. | 355/55 X |
| 3,692,406 | 9/1972 | Blachut et al. | 355/52 X |
| 3,772,977 | 11/1973 | Guccione | 354/121 |
| 3,915,569 | 10/1975 | Polzleitner | 355/52 |

FOREIGN PATENTS OR APPLICATIONS 506,757   6/1939   United Kingdom ............... 352/142

*Primary Examiner*—Donald A. Griffin
*Attorney, Agent, or Firm*—Gersten Sadowsky; Donald A. Gardiner

[57] ABSTRACT

In a method and apparatus for manipulating line weight in an image representation, and particularly for increasing line weight of a contour map in slope mapping, a lens orbiting attachment is included between a cartographic camera and lens. During exposure of the image, using the attachment, the lens is orbited about the optical axis of the camera in a plane parallel to the image. The diameter of the orbit is stepped, during oribiting, between zero, wherein the lens is concentric with the optical axis of the camera, and a predetermined maximum diameter depending on amount of line spreading required. The resulting trajectory of the lens tends to widen the image lines in all directions on the film to provide uniform line spreading. The lens is contained within inner and outer eccentric ring members, and the eccentricity of the lens relative to the optical axis of the camera depends upon the relative angular orientation of the two members. A first motor rotates both of the eccentric ring members (this causes the lens to orbit about the optical axis of the camera), while a second motor rotates the members relative to each other to change the radius of the orbit. A cam attached to the outer ring member synchronizes stepping of the lens orbit diameter to rotation of the outer eccentric ring member. The result is that the diameter of the lens orbit changes continuously during exposure. The lens floats in a precision ball bearing within the inner ring member so that the lens does not rotate during orbiting. Thus, image distortion, caused by any eccentricity of the lens itself, is eliminated.

26 Claims, 13 Drawing Figures

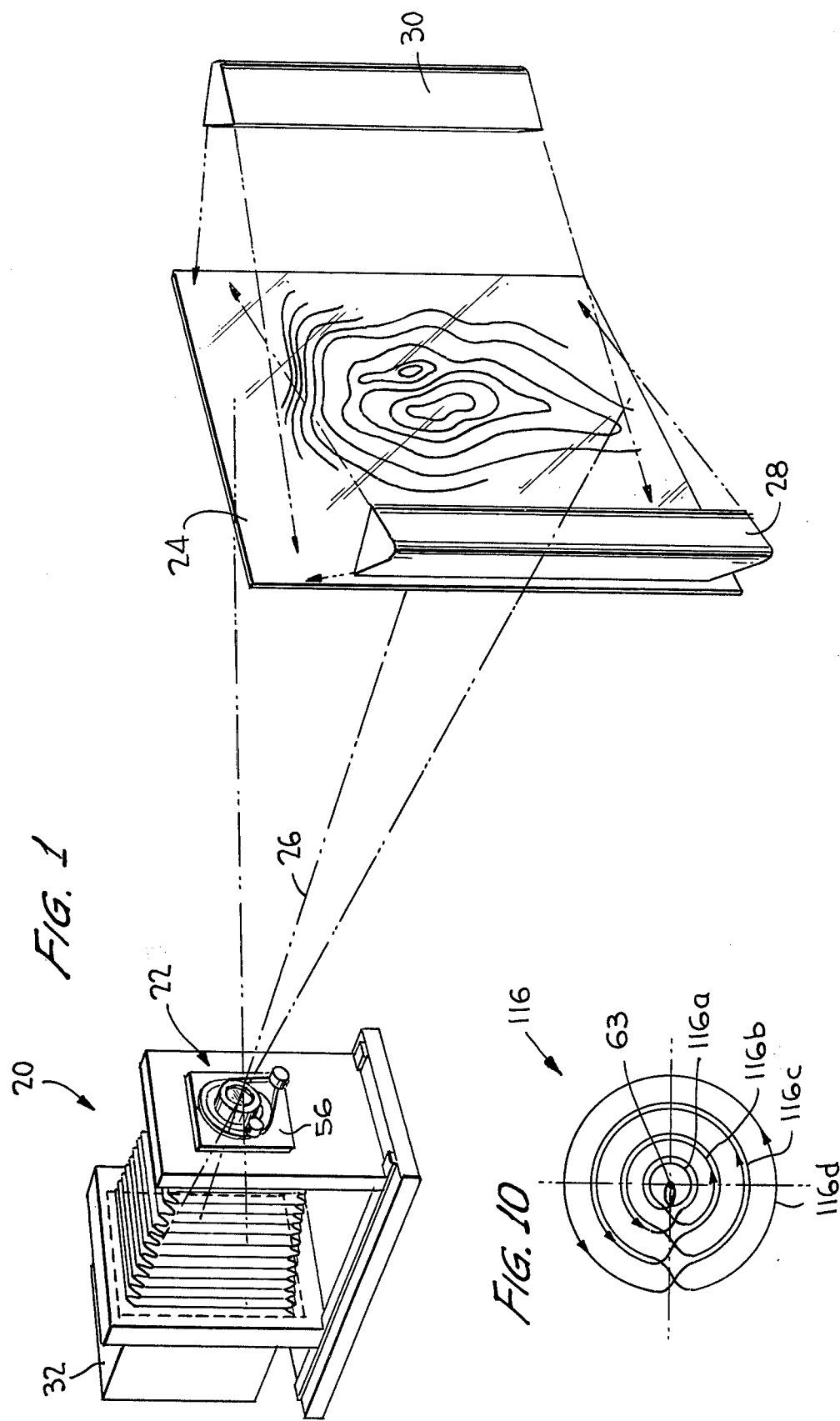

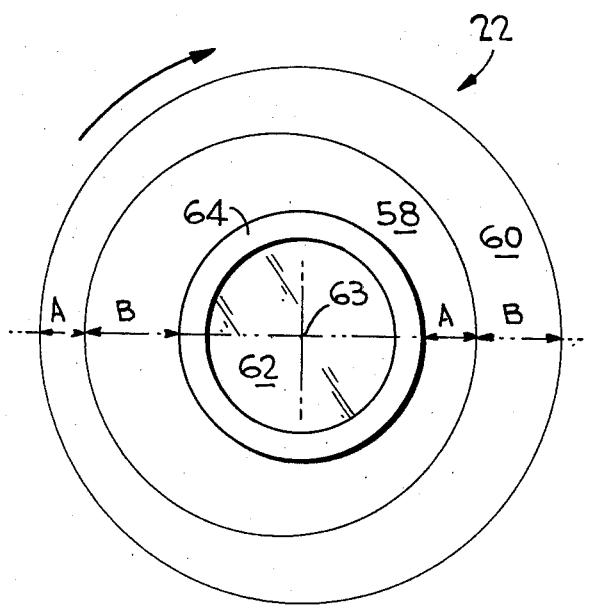
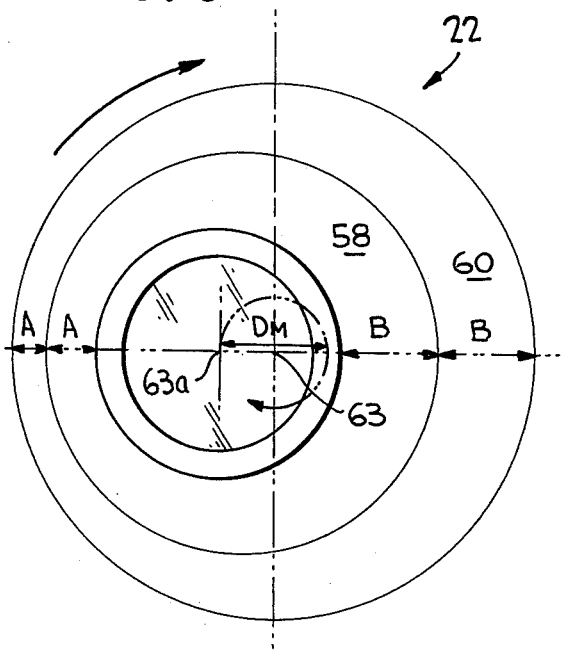
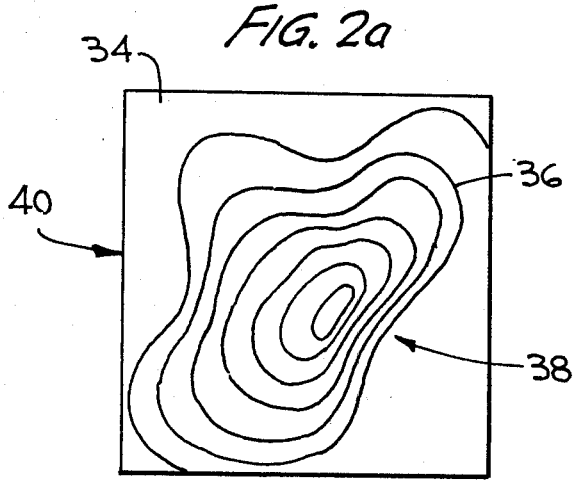
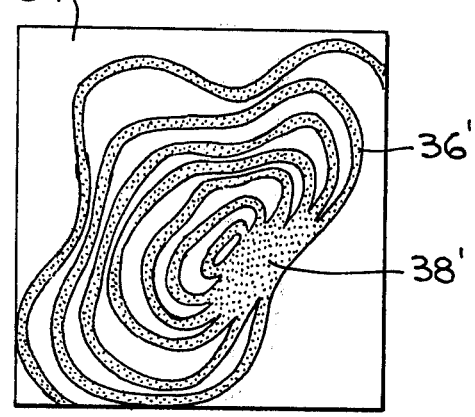
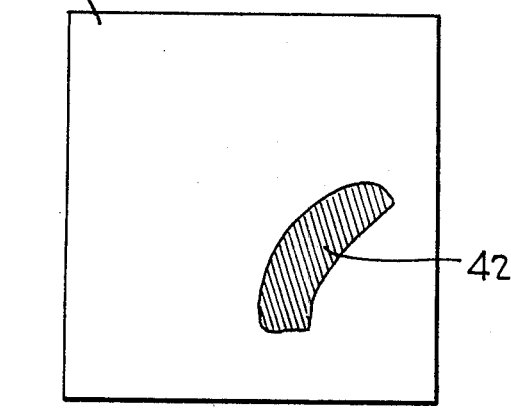
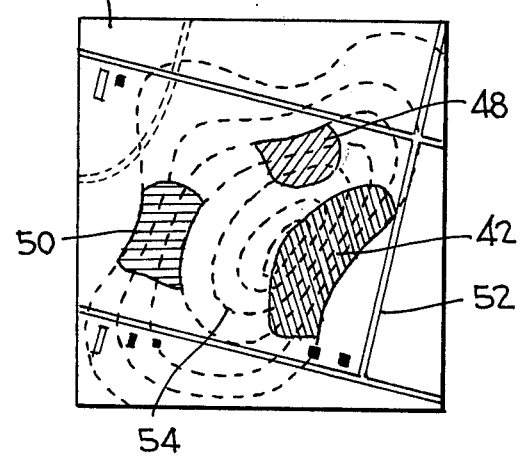

METHOD AND APPARATUS FOR MANIPULATING LINE WEIGHT IN AN IMAGE

BACKGROUND OF THE INVENTION

The present invention relates to a method and apparatus for manipulating line weight in an image representation, and more particularly, a method and system for spreading the contour lines in slope mapping, wherein a camera lens is orbited in a plane parallel to the image.

A slope map, defined as one which depicts bands or regions of terrain wherein the terrain slope is greater than or equal to a defined slope, is particularly useful in studies related to land use. Typically, up to five or six such bands in different colors are displayed on the slope map representing, for example, terrain slopes ranging between zero and 5%, 5% and 15%, 15% and 30%, 30% and 50%, 50% and 70%, and slopes greater than 70%. The map is prepared at a predetermined scale, e.g., 1:24,000.

Generally, a slope map is prepared from a contour map negative containing contour lines which represent constant altitude regions, with adjacent contour lines being at a predetermined altitutde differential, e.g., 10 feet (the contour lines are closer together in steep terrain, than they are in relatively flat terrain). In order to form slope bands, the line thickness on the contour map negative is increased by an amount which depends upon map scale, contour interval and desired slope band. As the contour lines are thickened, contour lines spaced relatively close to each other coalesce to form a slope band representative of a region having a slope of at least a preselected value, depending on resultant line thickness. For example, where a relatively high slope band (representing only steep terrain) is required, e.g., 70% and greater, the contour lines are thickened by only a relatively small amount, and only contour lines that are very close to each other coalesce. On the other hand, where a relatively low slope band (representing relatively flat as well as steep terrain) is required, e.g., 15% and greater, the contour lines are thickened by a substantial amount. In the latter case, even contour lines that are spaced apart by a relatively large distance tend to coalesce.

The process of making a slope map requires first that a second contour map negative be prepared from the original negative with the contour lines thickened by a calculated amount to define the required slope band. Then, with the contour lines thickened, and slope band defined, a positive is made from the second negative. During production of the positive, contour lines outside of the slope band undergo a process known as "chokeback", i.e., are reduced in thickness until eliminated. Finally, another negative is made from the positive, depicting only the desired slope band. The entire process is repeated for each slope band required. In optional additional steps, the original contour lines can be superimposed on the negative, along with planographic details such as roads, houses, and the like.

Perhaps the most critical step in the process of slope mapping described above is the step of spreading (thickening) contour lines to form desired slope band. In order to prepare slope maps depicting low percentage slope regions, e.g., in the range of 5 to 10%, the contour lines must be thickened by a substantial amount (up to one-third inch). Spreading or thickening of the contour lines must be uniform and undistorted in order to present an accurate representation of the slope band with a minimum of touching-up required.

Although generally somewhat satisfactory for limited line weight manipulation, prior art apparatus of which I am aware are unsuitable for wide line spreading. For example, in U.S. Pat. No. 3,508,826 to Grabau, the image of an original copy is projected to a fixed light sensitive film in a camera through a lens oriented obliquely to the image copy. The lens is rotated in order to set up a "wobble" to create line spreading on the film. However, since the axis of the lens is oblique to the image, image distortion is created, particularly at fringe areas in a large field of view. Furthermore, since the lens itself rotates, distortion of the image is created by any eccentricity existing in the lens. These undesirable effects are especially prevalent when line spreading is large because the axis of the lens must be made even more oblique to the image copy.

In U.S. Pat. No. 3,204,544 to Shannon, line spreading is effected by employing a controlled, oscillating, flat tabletop, wherein the table defines an orbit having a preselected, fixed diameter. Shannon's system is useful for relatively little line-spreading; for large line-spreading, however, the system creates anomalies or "frills", that is, spurious edges in the thickened contour lines. The reason for the anomalies and spurious edges in that the table oscillates with a fixed diameter. "Painting" of the thickened line image onto the photosensitive film is incomplete, gaps are left in some of the slope bands, and there is loss of detail at the slope edges. Furthermore, Shannon's system is a contact printing system, and since there is no lens magnification available, the scale of the resultant slope map cannot be redefined or corrected for shrinkage.

OBJECTIVES OF THE INVENTION

Accordingly, one object of the present invention is to provide a new and improved method and system for manipulating line weight in an image representation.

Another object of the present invention is to provide a new and improved method and apparatus for manipulating line weight in an image representation, wherein lines can be thickened by even a substantial amount without causing distortion or spurious edges.

Another object of the present invention is to provide a new and improved method and apparatus for manipulating line thickness in an image representation, wherein a lens is orbited about the optical axis of a camera.

Another object of the present invention is to provide a new and improved method and system for manipulating line weight in an image representation, wherein a lens is orbited about the optical axis of a camera and maintained parallel to the image to prevent distortion.

Another object of the present invention is to provide an apparatus for manipulating line weight of an image representation utilizing a simple attachment for a conventional cartographic camera and lens.

Another object of the present invention is to provide an apparatus for manipulating line weight in an image representation, wherein amount of manipulation can be manually preset.

Another object of the present invention is to provide a new and improved method and system for increasing line weight in a contour map, wherein a lens is orbited about the optical axis of a camera and in a plane parallel to the map, and the diameter of the orbit is "stepped" to avoid gaps or spurious edges in the slope bands.

SUMMARY OF THE INVENTION

In a method and apparatus for manipulating line weight in an image representation, particularly contour lines in a slope mapping, a lens orbiting attachment is included between a cartographic camera and lens to orbit the lens about the optical axis of the camera in a plane parallel to the image during exposure. The diameter of the orbit is "stepped" between zero (wherein the axis of the lens is coincident with the optical axis of the camera), and a maximum diameter determined by the desired line thickness. During exposure of the film, and while the lens is orbiting, the diameter of the orbit is changed in small steps between the two limits several times to ensure uniform line thickening without creating gaps or spurious edges. The lens itself does not rotate during orbiting to prevent distortion caused by any eccentricity of the lens itself.

The lens orbiting attachment comprises a base member which is mounted in line with the lens aperture of a conventional cartographic camera. The base member supports an eccentric assembly comprising inner and outer eccentric ring-like members (hereinafter termed "inner eccentric" and "outer eccentric") which are rotatable with respect to the base member and to each other. The lens is mounted to the inner eccentric on a set of precision ball bearings. As the inner and outer eccentrics are rotated relative to each other, the lens is variably displaced from the optical axis of the camera. With the lens displaced, any rotation of the eccentric assembly relative to the base member causes the lens to move in an orbit about the optical axis of the camera. The diameter of the orbit depends upon the relative rotational alignment of the two eccentrics.

A first electric motor, attached on the base member, rotates the inner and outer eccentrics (eccentric assembly) as a single unit by means of a belt partially wrapped around the rim of the outer eccentric. A second electric motor, located on the exposed face of the outer eccentric, engages a raised, annular gear member attached to the inner eccentric. Energization of the second electric motor causes the inner eccentric to rotate relative to the outer eccentric, and thereby changes the diameter of lens orbiting.

Energization of the second motor (controlling lens orbit diameter) is synchronized to rotation of the outer eccentric. A cam, attached to the outer eccentric, closes a switch, mounted on the base member, which supplies a DC voltage to the second motor. An annular, electrically conductive track disposed along the exposed face of the outer eccentric and in rubbing contact with the switch directs the DC voltage to the second electric motor, as described below. With each revolution of the outer eccentric, the second motor is "stepped" by an amount determined by the size of the cam.

Also located on the exposed face of the outer eccentric are first and second limit switches. The limit switches are in electrical contact with the electrically conductive track, but are spaced apart from each other along an arc corresponding to the maximum relative rotation permitted between the inner and outer eccentrics during exposure (which depends on amount of line thickening). The output of each of the limit switches is connected to a polarity reversing, latching relay. The output of the relay is, in turn, connected to the second DC motor.

Limit stops, corresponding respectively to the first and second limit switches, are mounted to the face of the inner eccentric. The limit stops define the center axis of the eccentric assembly, and maximum lens orbit, and determine the amount of line thickening of the image representation by controlling the maximum relative rotation of the inner and outer eccentrics. As the inner eccentric is caused to rotate clockwise, for example, relative to the outer eccentric, at one extreme of rotation, the second limit switch on the outer eccentric is closed by its corresponding limit stop on the inner eccentric. Closure of the second limit switch reverses the direction of the second motor via the polarity reversing latching relay. Then, the inner eccentric is caused to rotate counterclockwise with respect to the outer eccentric until the first limit switch is closed by its corresponding limit stop. Closure of the first limit switch again reverses the direction of the second motor via the reversible latching relay, and so on. Of course, as the inner and outer eccentrics are rotated successively clockwise and counterclockwise relative to each other, the eccentric assembly (comprising the inner and outer eccentrics) is continuously rotated by the first DC motor. The resulting trajectory of the lens is a family of concentric circular orbits about the optical axis of the camera, with the orbits having diameters ranging between zero and a predetermined maximum diameter controlled by one of the limit stops and set according to desired line thickness.

The limit stop which controls maximum lens orbit diameter (as well as line thickness) is in the form of a micrometer for fine adjustment. The micrometer is screw-mounted to an annular channel in the inner eccentric, and can be displaced within the annular channel for coarse adjustment of line thickness.

Still other objects and advantages of the present invention will be readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is a perspective view of a cartographic camera, having a lens orbiting attachment, in accordance with the invention, along with a back-lighted copy of a contour map;

FIGS. 2a-2d are illustrations which help explain the primary steps in developing a slope map;

FIG. 5 is a schematic representation of the orbiting lens attachment with the lens concentric to the optical axis of the camera;

FIG. 6 is a schematic representation of the orbiting lens attachment with the lens offset from the optical axis of the camera;

FIG. 10 is a simplified illustration of the orbital trajectory of the lens carried by the attachment of FIG. 5.

DETAILED DESCRIPTION OF A PREFERRED EMBODIMENT

Figure 3:
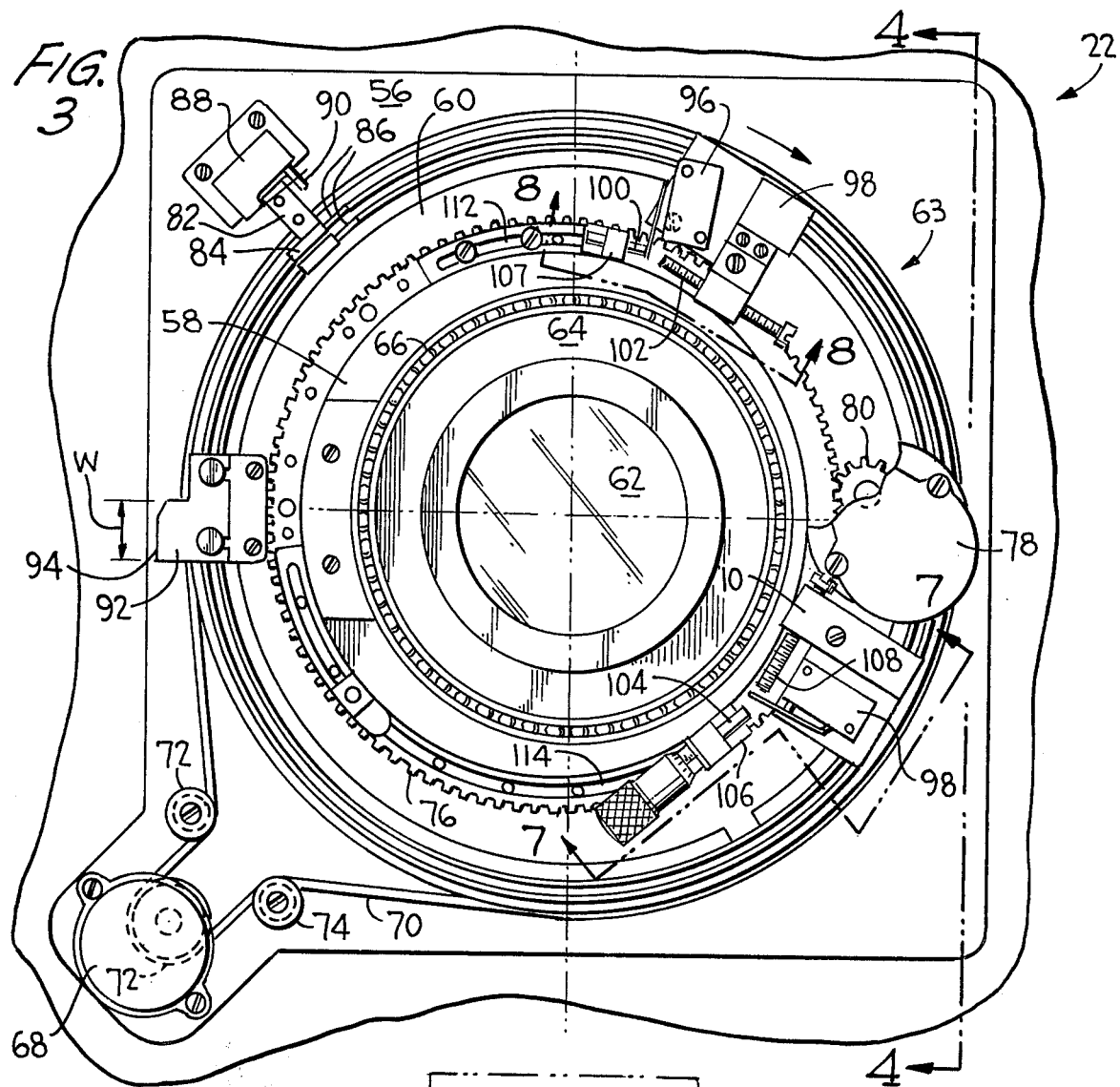
FIG. 3 is a plan view of an orbiting lens attachment in accordance with the invention.

Referring to FIG. 1, a conventional cartographic camera 20, equipped with an orbiting lens attachment 22, in accordance with the invention, is located in optical alignment to a contour map negative 24. Negative 24, which is 24 inches by 30 inches, is oriented on the optical axis 26 of camera 20 and normal thereto, i.e., lens attachment 22 lies in a plane parallel to negative 24. The negative 24 is back-lighted by high intensity lamps 28 and 30 which may be, for example, quartz or xenon lighting units. With negative 24, back-lighted by the lamps 28 and 30, an image of the contour lines contained on the contour map negative is projected onto light sensitive film in film pack 32 attached to the rear of cartographic camera 20. The camera 20 is adjusted by conventional means for 1:1 magnification. Any motion of the lens transverse to optical axis 26 is magnified by a factor of four at the film.

Contour map negative 24 contains a family of contour lines representing terrain having altitude differentials of a predetermined distance, e.g., 10 feet. In regions of terrain wherein slope is large (steep), the contour lines are relatively closely spaced. On the other hand, in regions of the terrain that are relatively flat, the contour lines are widely spaced apart. Accordingly, by viewing the contour map, one can quickly obtain a basic knowledge of the flatness or steepness of all the regions of a terrain covered by the contour map.

Slope maps showing areas of critical ranges of terrain slope, i.e., regions wherein the terrain slope is within a predetermined range of slopes, or greater than a predetermined slope, are particularly useful in studies related to land use. These maps include slope bands for identifying the predetermined slope regions, and may also include contour lines for indicating altitude. Often, planographic data, i.e., houses, roads, etc., are also included on the map. By glancing at a slope map, one can rapidly determine the approximate overall contour of the terrain along with quick identification of regions having a predetermined range of slopes.

Slope maps are typically generated from a contour map negative. As an overview, the contour lines on the contour map negative are spread or thickened by a predetermined amount in order to cause the contour lines in the slope region of interest to coalesce forming slope bands. A second negative having the thickened contour lines is made from the first negative. Then, the second negative having thickened contour lines is photographically "choked-back", that is, a positive is generated from the second negative whereby contour lines outside the slope bands are eliminated leaving only slope bands. This process is repeated for each slope band required, with the contour lines thickened by a different amount for each desired slope region. Finally, a composite negative is formed with all the slope band regions contained thereon. As optional additional steps, the original contour lines may be superimposed on the contour bands, and planographic data may be added.

Referring to FIGS. 2a-2d, and initially to FIG. 2a, a contour map negative 34 contains a family of contour lines 36 representing terrain altitude differentials of a predetermined distance, e.g., 10 feet. The contour lines are more closely spaced together in region 38 than they are, for example, in region 40 of the contour map 34. Since each contour line represents terrain at a constant altitude, and adjacent contour lines represent ten feet altitude differentials, it is apparent that the terrain in region 38 is steeper (i.e., has a larger percent slope) than the terrain in region 40.

Assuming, for this example, that it is desired to identify only terrain having a percentage slope greater than 50%, and that only region 38 contains such a range of slopes, it is apparent that region 38 can be uniquely identified on a second negative 34 by thickening contour lines 36 until the contour lines in region 38 coalesce to form a continuous black band 38' (see FIG. 2b). The amount by which contour lines 36 in contour map negative 34 are thickened to form lines 36' in the second map negative 34' depends upon the map scale, the altitude differential represented by adjacent contour lines and the particular slope regions to be depicted. For example, with a contour map having a scale 1–24,000, with adjacent contour lines representing ten feet altitude differentials, and with the desired slope region depicting terrain slopes greater than or equal to 8%, contour line thickness is, in practice, spread to a thickness of ⅛ inch. Where 3% slope regions are to be depicted, the contour lines are spread to one-third inch.

Still referring to FIG. 2b, as aforementioned, contour lines 36' have a thickness whereby the lines in region 38' coalesce to form solid band 38' depicting terrain slopes greater than or equal to the desired slope. Of course, the contour lines 36' outside the region 38' are also thickened. However, during formation of a positive 44 (FIG. 2c) from second negative 34', the contour lines 36' outside the band 38' are "choked-back" (thinned out) to remove all contour lines extending outside the band 38'. The entire procedure is repeated for each desired percentage slope band to be depicted (up to six such bands are considered practical), and a final negative 46 (FIG. 2d) containing slope band 42 and, e.g., additional bands 48 and 50 is produced. Planographic data 52, depicting houses, roads, and the like, may be added to negative 46. As an optional final step, contour lines 54, corresponding to lines 36 in FIG. 2a are superimposed on negative 46. Negative 46 can be used to generate a virtually unlimited number of slope maps containing the terrain data mentioned above.

Referring now to FIGS. 3–6, orbiting lens attachment 22, in accordance with the invention, will be described. The basic components of lens orbiting attachment 22 comprise lens 62 mounted in lens mounting ring 64, and an eccentric assembly 63 which consists of inner eccentric ring member 58 and outer eccentric ring member 60 (hereinafter termed "inner eccentric" and "outer eccentric" respectively). Lens 62, lens mounting ring 64, inner eccentric 58 and outer eccentric 60 are mounted on a base member 56 which, as shown in FIG. 1, attaches to the face of camera 20.

Outer eccentric 60 is rotated by motor 68, which is a DC powered electric motor, through drive belt 70. Drive belt 70 is partially wrapped around armature 72 of motor 68 and extends around the rim of a raised annular member 73 attached to outer eccentric 60 (see FIG. 4).

Figure 4:
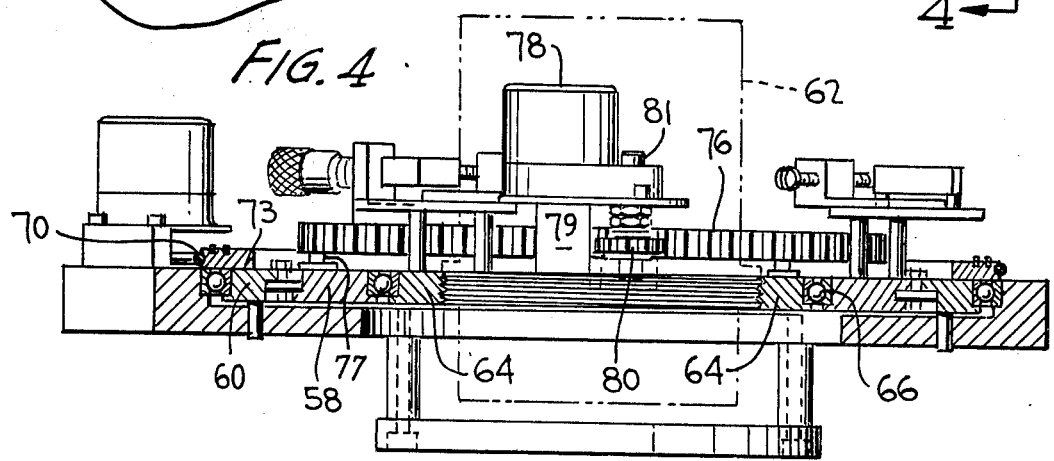
FIG. 4 is a side view of the attachment viewed along the line 4—4 in FIG. 3.

Still referring to FIG. 4, a raised annular gear 76 is mounted to inner eccentric 58 with pedestals 77. A second motor 78, which is also a DC powered electric motor, is mounted to the exposed face of outer eccentric 60 on a pedestal 79. A drive gear 80, rotated by motor 78, via shaft 81, is meshed with annular gear 76.

When motor 78 is energized, drive gear 80 is caused to rotate. The drive gear 80, engaged with annular gear 76, causes rotation of inner eccentric 58 relative to outer eccentric 60. However, when motor 78 is de-energized, there is no relative rotation between inner eccentric 58 and outer eccentric 60. In that condition, inner eccentric 58 and outer eccentric 60 rotate as a single unit when the outer eccentric is caused to rotate by drive belt 70.

Lens mounting ring 64 and lens 62 are mechanically isolated from inner eccentric 58 because the mounting ring 64 floats within precision ball bearing unit 66. In practice, there may be some rotation of lens mount 64 and lens 62 with rotation of inner eccentric 58 due to imperfect mechanical isolation; however, any rotation is slight. Also assuming lens 62 is a precision lens, minor rotation thereof is optically insignificant.

Before describing orbiting lens attachment 22 in more detail, an overview of the operation of the attachment will now be given with reference to FIGS. 5 and 6. Referring first to FIG. 5, with inner eccentric 58 and outer eccentric 60 aligned to each other with narrowest portion A of outer eccentric 60 adjacent widest portion B of inner eccentric 58, lens ring 64 is oriented about center axis 63 of attachment 22, i.e, the lens 62 is concentric to the outer periphery of outer eccentric 60. As outer eccentric 60 is rotated by drive belt 70 (FIG. 3) with inner and outer eccentrics 58 and 60 maintained stationary relative to each other by engagement of gear 76 with gear 80, lens 62 remains stationary in the position shown; it does not orbit since the axis of the lens 63a is located on center axis 63.

However, referring to FIG. 6, inner eccentric 58 is rotationally displaced by 180% relative to outer eccentric 60. Widest portions B of inner and outer eccentric 58 and 60 are adjacent each other on one side of lens mounting ring 64, while narrowest portions A of the eccentrics are adjacent to each other at the opposite side of the lens mounting ring. The axis 63a of lens 62 is displaced from center axis 63 to the location shown. Accordingly, with clockwise rotation of outer eccentric 60 by drive band 70 (FIG. 3), lens 62 is caused to orbit about center axis 63 along the trajectory defined by the dotted arrow. The diameter $D_m$ of the orbit trajectory, shown in FIG. 6, is the maximum orbit diameter because lens axis 63a is fully offset from the center axis 63. It is apparent, however, that with rotation of inner eccentric 58 relative to outer eccentric 60 (from the relative orientation of eccentrics 58 and 60 shown in FIG. 6 toward that shown in FIG. 5), the diameter of the lens orbit decreases toward zero. It is apparent that, an inner and outer eccentrics 58 and 60 are rotated relative to each other during rotation of outer eccentric 60 by drive belt 70, the trajectory axis 63a of lens 62 approximately describes a spiral.

Figure 8:
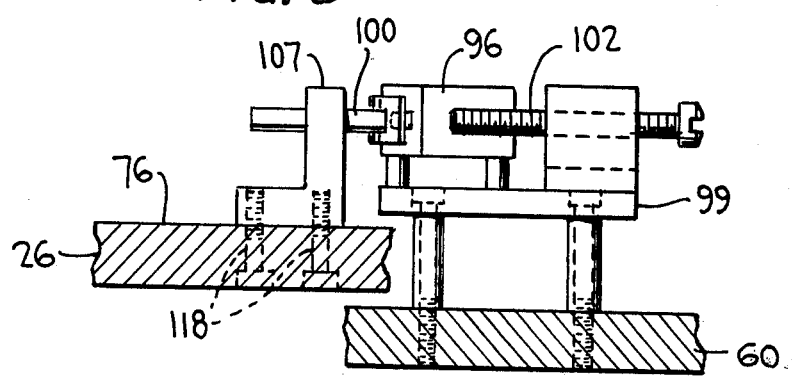
FIG. 8 is a detail of the other limit switch - limit stop pair viewed along the line 8—8 in FIG. 3.

In practice, during exposure of light-sensitive film within film pack 32 of camera 20 (FIG. 1) outer eccentric 60 is rotated clockwise, while inner eccentric 58 is rotated successively clockwise and counterclockwise relative to outer eccentric 60. This action causes lens 62 to move about center axis 63 with orbits having a diameter reciprocating between zero and a maximum diameter. The diameter of the lens orbit is zero when the inner and outer eccentrics 58 and 60 are aligned in the positions shown in FIG. 5, while the maximum orbit diameter depends upon the amount of rotation permitted between inner and outer eccentrics 58 and 60. As aforementioned, the maximum lens orbit is effected when the eccentrics are aligned as shown in FIG. 6. In practice, the relative rotational position of eccentrics 58 and 60 is limited to somewhat less than that shown in FIG. 6 by means of a pair of limit stops 100,104, as described in detail below. Briefly, however, limit stops 100,104, mounted to inner eccentric 58 with brackets 106,107 (see also FIGS. 8 and 9), are adjusted to cause rotation of inner eccentric 58 from the position shown in FIG. 5 to a displaced position (intermediate the positions shown in FIG. 5 and FIG. 6) which is set according to the desired line spread or thickness of image representation 24 (FIG. 1).

The orbiting of lens 62 relative to image 24 simulates relative movement between the image and light sensitive film within camera 20, and creates uniform spreading of the image with respect to the film, i.e., all lines and points on image 24 are uniformly spread in all directions. The amount of spreading depends upon the diameter of orbiting of lens 62, and gradually reducing the diameter of the orbit toward zero ensures that no gaps be formed in the linework, or spurious edges created. In practice, the diameter of the lens orbit is successively changed between zero to a maximum diameter at least three or four times during exposure to ensure uniform spreading.

Of particular importance, lens 62 is at all times maintained parallel to image 24 so that no distortion, particularly at the image fringes, is caused by any "wobbling" of the lens.

Referring again to FIGS. 3 and 4, an electrically conducting track 82 is disposed on a raised annular portion 73 of the exposed face of outer eccentric 60. An arm 84, mounted to bracket 86 contains a pair of commutating members 86 maintained in rubbing contact with conductive tracks 86. A push-button switch 88, also mounted to bracket 82, supplies DC power to conductive track 82 when switch is activated, i.e., push-button actuator 90 of switch 88 is depressed.

Also mounted to the exposed face of outer eccentric 60 is a cam actuator 92. Actuator 92, which rotates with the outer eccentric 60, contains a cam surface 94 having a width W. During each revolution of outer eccentric 60, cam surface 94 depresses push-button actuator 90 on switch 88 for a time duration depending on the width W of the cam surface.

Limit switches 96 and 98 are mounted on outer eccentric 60 and are electrically connected (hard-wired) to conductive track 82. As described in more detail below, switch 88 energizes motor 78 via cam 92 to "stepwise" rotate inner eccentric 58 relative to outer eccentric 60, while limit switches 96 and 98 control the direction of rotation of the inner eccentric via limit stops 100,104. The location of limit stops 100,104 determine maximum lens orbit diameter and accordingly, line thickness.

Figure 9:
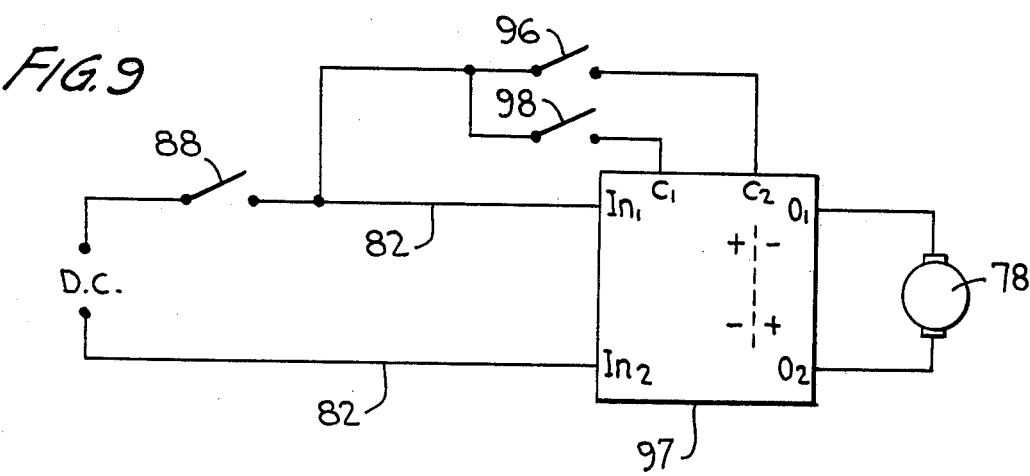
FIG. 9 is a circuit diagram of the electrical connections incorporated in the lens orbiting attachment of FIG. 3.

Referring now to FIG. 9, limit switches 96 and 98 are connected between one side of track 82 and a conventional polarity reversing, latching relay 97, the output of which is in turn connected to motor 78. Relay 97 receives DC voltage at input terminals $I_{N1}$ and $I_{N2}$ and supplies DC voltage to motor 78 through output terminals $O_1$ and $O_2$. Each time limit switch 96 is closed, DC voltage is supplied to control terminal $C_2$ causing relay 97 to internally latch so as to supply positive DC voltage to output terminal $O_1$ relative to output terminal $O_2$. On the other hand, when limit switch 98 is closed, relay 97 internally latches to supply negative DC voltage to output terminal $O_1$ relative to output terminal $O_2$. Since motor 78 is a DC motor in the preferred embodiment, limit switches 96 and 98 in effect control the direction of rotation of the motor 78. More specifically, when limit switch 98 is closed by limit stop 104, relay 97 causes gear 80 of motor 78 to rotate counterclockwise in turn causing inner eccentric 58 (via gear 76) to rotate clockwise until limit switch 96 is closed by limit stop 100. Then, relay 97 supplies DC voltage to motor 78 at a polarity to cause gear 80 to rotate counterclockwise. As gear 80 rotates clockwise, the inner eccentric 58 rotates counterclockwise via gear 76 until limit switch 98 is again closed by limit stop 104 and so on.

Since cam 92 closes push-button actuator 90 of switch 88 only momentarily once during each revolution of outer eccentric 60, motor 78 is energized by pulses, each of which has a pulse width corresponding to width W of cam 92, and a frequency depending on the rotational velocity of outer eccentric 60. Therefore, during rotation of outer eccentric 60, there is stepwise rotation of inner eccentric 58 relative to outer eccentric 60, and stepping is synchronized to rotation of the outer eccentric.

Referring now to FIGS. 3 and 9, structure of the limit switch — limit stop arrangement will be described in greater detail. As aforementioned, as outer eccentric 60 rotates clockwise, in a continuous manner, driven by belt 70, inner eccentric 58 is stepped clockwise, relative to the outer eccentric, until limit switch 96 (see FIG. 8) is closed by limit stop 100 mounted to bracket 99 in channel 112 of inner eccentric 58. When switch 96 is closed by stop 100, relay 97 reverses the direction of rotation of motor 78 causing the inner eccentric 58 to step in a counterclockwise direction until limit switch 98 is closed by limit stop 104 (see FIG. 7). Limit stop 104 is a micrometer secured to bracket 106, which is in turn mounted in channel 114 of inner eccentric 58. Adjustment of the micrometer 104 controls the limit of rotation permitted between eccentrics 58 and 60. That is, when micrometer limit stop is adjusted to move it to the left, away from switch 98, greater relative rotation of eccentrics 58 and 60 is permitted before closure of switch 98. On the other hand, with micrometer 104 adjusted to move it to the right, closer to switch 98, less relative rotation between eccentrics 58 and 60 is permitted.

A bolt 108 is mounted to bracket 110 to prevent damage to the actuating arm of switch 98 caused by an overshoot of inner eccentric 58 during reversal of motor 78. Similarly, bolt 102, mounted to bracket 99, is provided opposite limit stop 100 to prevent damage to the actuating arm of switch 96.

Figure 7:
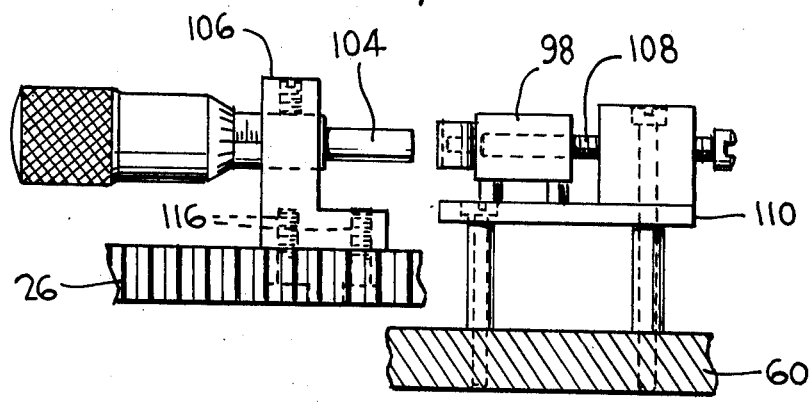
FIG. 7 is a detailed view of one of the limit switch - limit stop pairs viewed along the line 7—7 of FIG. 3.

While micrometer 104 provides fine adjustment of the limits of relative rotation of eccentrics 58 and 60 (maximum lens orbit diameter), coarse adjustment is effected by sliding limit stop mounting bracket 106 along groove 114, and then tightening the bracket with bolts 116 (see FIG. 7). However, coarse adjustment is generally unnecessary since I have found that a ½ inch range on the micrometer causes a line spread of 0.4 inch on the film. This is adequate for most slope mapping applications.

Summarizing the relative movement of inner eccentric 58 and outer eccentric 60 creating the orbital trajectory of lens mount 64 and lens 62, the outer eccentric is rotated continuously in one direction by drive belt 70, e.g., clockwise, as shown in FIG. 3. Simultaneously, the inner eccentric 58 is stepwise rotated in one direction relative to outer eccentric 60, and then stepwise rotated in the oppostie direction. The inner eccentric 58 is successively rotated clockwise and counterclockwise between limit stops 100 and 104 several times during exposure depending upon the thickness of line work required, the film speed and other considerations. The result is that lens 62 is caused to orbit about central axis 63 with a diameter that is stepwise changing between zero and a maximum diameter depending on the setting of micrometer 104 (as well as positions of limit stop brackets 106,107).

The trajectory 116 of lens 62 is approximated in FIG. 10 wherein lens 62, originally located at central axis 63, is stepped out during clockwise revolution of outer eccentric 60 controlled by motor 68 to orbit 116a and, after another clockwise revolution of outer eccentric 60, is stepped out to orbit 116b. Similarly, after another clockwise revolution, lens 62 is stepped out to orbit 116c and finally, after an additional clockwise revolution, lens 62 is stepped out to orbit 116d. As described above, orbital stepping of lens 62 is caused by relative rotation of eccentric 58 and 60 controlled by motor 78.

At this time, switch 98 is closed by limit stop 104, reversing the direction of motor 78, to step lens 62 back to center axis 63 during the counterclockwise rotation of outer eccentrics. When lens 62 reaches center axis 63, limit switch 96 is closed by limit stop 100 and motor 78, via relay 97, is reversed causing the lens orbit to again step toward outer orbit 116d, and so on. It should be understood that while limit stop 100 permits lens 62 to step only to center axis 63, limit stop (micrometer) 104 limits the diameter of outer orbit 116d.

In actual practice, exposure time is approximately 1½ to 2 minutes with an average of 20 steps of motor 78 made, causing the lens orbit to step several times between center axis 63 and outer orbit 116d (each step of motor 78 creates an orbit having a successively larger or smaller diameter). Each step (orbit change) causes line spreading of approximately twice the thickness of the original line. I have found that line width can be thickened by up to 2 inches with increased exposure time when the maximum offset between axis 63 and 63a (see FIG. 6) is 0.50 inch. This requires adjustment of limit stop bracket 106 and corresponds to a maximum orbit diameter of 1.0 inch.

The speed of motor 68 affects exposure, and I have found that a speed of approximately 11 revolutions per minute provides practical saturation of the film; however, motor speed can be varied depending upon film speed and other considerations. For example, it may be desirable to decrease the speed of rotation of motor 68 for extra wide line spreading to ensure saturation of the film throughout the relatively large orbit of lens 62.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein. For example, it is apparent that any suitable means for synchronizing stepping of motor 78 to rotation of outer eccentric 60 can be used. For example, conventional optical means for sensing rotation of the outer eccentric 60 could be used, with the duration of each step of motor 78 being controlled by a conventional time delay circuit, such as a monostable multivibrator circuit. Also, although the invention has been described primarily in conjunction with the production of a slope map from a contour map negative, it is to be understood that the invention is applicable to any other environment concerning line weight manipulation, e.g., printed circuit board production or pattern modification.

What is claimed is:

1. A lens holding attachment for a camera for manipulating line weight associated with an image representation, comprising a base member attachable to said camera; inner and outer eccentric ring members rotatably mounted on said base member, said inner ring member disposed within said outer ring member and containing said lens; a center axis of said lens being displaced from a center axis of said outer eccentric ring member by a distance depending on a relative rotation between said inner and outer ring members; first motor means for rotating said outer ring member about the center axis thereof; and second motor means for causing rotation of said inner ring member relative to said outer ring member during rotation of said outer ring member.

2. The apparatus of claim 1, including means for pulse energizing said second motor means including a first switch stationarily mounted relative to said camera, and cam means mounted to said outer eccentric ring member, said cam means operating said first switch means synchronously with respect to rotation of said outer ring member.

3. The apparatus of claim 2, including means for reversing the direction of rotation of said inner eccentric ring member relative to said outer eccentric ring member as a function of line weight manipulation.

4. The apparatus of claim 3, wherein said reversing means includes second and third switch means located on said outer eccentric ring member, said second and third switch means being operated respectively by first and second limit stop means spaced apart from each other and located on said inner eccentric ring member.

5. The apparatus of claim 4, including coarse adjustment means for adjusting the maximum rotation of said inner eccentric ring member relative to said outer eccentric ring member, including means for adjusting the location of at least one of said limit stop means on said inner eccentric ring member.

6. The apparatus of claim 5, including micrometer means cooperating with said limit stop means for providing fine adjustment of a maximum rotation of said inner eccentric ring member relative to said outer eccentric ring member.

7. The apparatus of claim 4, including polarity reversing relay means connected to said second and third switch means, an output of said relay means being connected to said second motor means.

8. A method of manipulating line weight of an image representation comprising the steps of orienting said image on the optical axis of a camera through lens associated with said camera; exposing light sensitive film within said camera to said image representation; and orbiting said lens about said optical axis while maintaining said lens parallel to said image representation.

9. The method of claim 8, including the step of changing the diameter of said orbiting of said lens during exposure of said film.

10. The method of claim 9, wherein said step of changing includes the step of stepwise changing the distance between the optical axis of said lens and the optical axis of said camera during said orbiting.

11. The method of claim 9, wherein the step of changing includes the step of repetitively controlling the diameter of said orbiting between zero and a preselected maximum diameter depending upon amount of line weight manipulation.

12. A lens holding attachment for a camera for manipulating line weight associated with an image representation comprising a mount for supporting said lens to said camera; means for moving said lens in a circular orbit about an optical axis of said camera and in a plane parallel to said image representation; and means for controlling the diameter of said orbit, said controlling means including means for varying the diameter of said orbit between zero and a preselected maximum diameter, where said maximum diameter is determined by amount of line weight manipulation.

13. The apparatus of claim 12, wherein said controlling means further includes means for stepwise varying the diameter of said orbit, a trajectory of said lens describing a family of concentric circles.

14. The apparatus of claim 12, wherein said lens moving means includes an outer ring member, said lens being enclosed by said ring member; means for offsetting an axis of said lens with respect to an axis of said ring member; and means for rotating said ring member about said ring member axis.

15. The apparatus of claim 14, including a lens mounting member disposed between said lens and an inner ring member; and means for causing relative rotation between said inner and outer ring members.

16. The apparatus of claim 15, wherein said inner and outer ring members are eccentric, and said means for causing relative rotation includes motor means located on one of said ring members for rotating the other one of said ring members.

17. The apparatus of claim 16, wherein said motor means is located on said outer eccentric ring member.

18. The apparatus of claim 16, including means for energizing said motor means in response to rotation of said outer eccentric ring member.

19. The apparatus of claim 18, wherein said energizing means includes a stationary first switch for energizing said motor means, said apparatus further including cam means mounted to said outer eccentric ring member, said cam means operating said first switch synchronously with respect to rotation of said outer ring member.

20. The apparatus of claim 15, including first switch means synchronized to rotation of said outer eccentric ring member for causing said relative rotation; and second switching means responsive to relative orientation of said inner and outer eccentric ring members for controlling the direction of said relative rotation.

21. The apparatus of claim 20, including reversible motor means responsive to said first and second switching means.

22. The apparatus of claim 21, wherein said motor means is mounted on one of said eccentric ring members, said motor means driving one of said ring members for causing said relative rotation.

23. The apparatus of claim 22, including annular electrically conducting track means disposed on said outer eccentric ring member, said first switching means supplying voltage pulses to said conducting track means, and said second switching means being in electrical contact with said track means and supplying said voltage pulses to said motor means.

24. The apparatus of claim 22, including means for adjusting said maximum diameter of said orbit.

25. The apparatus of claim 24, wherein said adjusting means includes micrometer means aligned with said second switching means for controlling an amount of relative rotation between said inner and outer eccentric ring members.

26. The apparatus of claim 15, including ball bearing means disposed between said lens and inner ring member.

* * * * *